United States Patent [19]

Goldsmith et al.

[11] Patent Number: 4,964,992
[45] Date of Patent: Oct. 23, 1990

[54] METHOD OF MAKING MEMBRANE-TYPE FILTER AND PRODUCT THEREOF

[76] Inventors: Susan H. Goldsmith, 5941 Daly Rd., Dexter, Mich. 48130; George P. Grundelman, 2030 Wolf Lake Rd., Grass Lake, Mich. 49240

[21] Appl. No.: 326,773

[22] Filed: Mar. 21, 1989

[51] Int. Cl.$^5$ .............................................. B01D 69/06
[52] U.S. Cl. ................................. 210/500.36; 264/49
[58] Field of Search .................... 264/49, 156; 429/94; 210/500.36, 500.22, 500.21

[56] References Cited

U.S. PATENT DOCUMENTS

| | | | |
|---|---|---|---|
| 3,930,886 | 1/1976 | Mesiti et al. | 264/49 X |
| 4,280,909 | 9/1981 | Deutsch | 210/500.21 X |
| 4,743,520 | 5/1988 | Rosansky | 429/94 |

Primary Examiner—Frank Spear
Attorney, Agent, or Firm—Dykema Gossett

[57] ABSTRACT

The present invention is directed to a membrane filter having predetermined controlled porosity and to the method for making such a membrane filter. The membrane filter has a plurality of pores, with each of the pores having a predetermined size from top to bottom located at predetermined locations across the membrane filter. The pores each have a tapered configuration with the larger opening at the surface of the membrane filter and the smaller opening at the bottom of the membrane filter. This tapered configuration permits pre-filtering. The membrane filter is made by a method which utilizes a probe having a tapered piercing tip that pierces the membrane to form the pores. Preferably, a plurality of probes are nested together so that a predetermined number of pores can be made with one reciprocation. If additional pores are needed for increased flow rate, the bundled probes can be laterally shifted or jogged with respect to the membrane material and further pores formed. The pore size is dependent upon the configuration of the tapered tip, as well as the vertical movement of the probe. The method permits membranes to be formed from PFA, perfluoroalkoxy, as well as from all presently used membrane filter materials formed.

17 Claims, 1 Drawing Sheet

U.S. Patent        Oct. 23, 1990        4,964,992
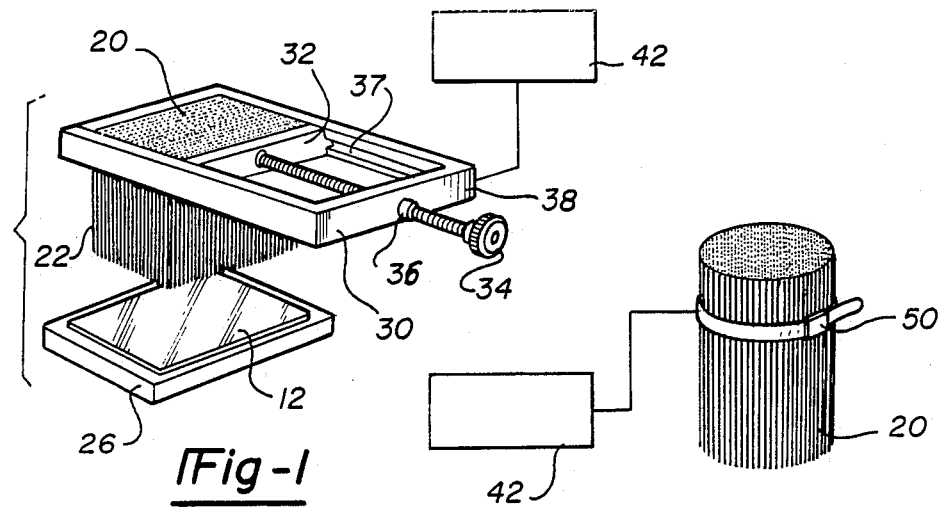
Fig-1
Fig-2
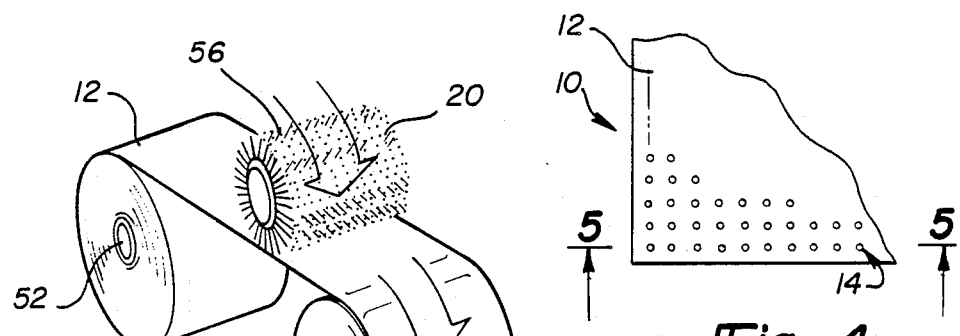
Fig-3
Fig-4
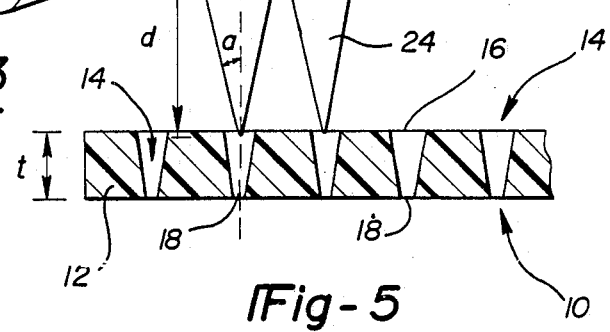
Fig-5

METHOD OF MAKING MEMBRANE-TYPE FILTER AND PRODUCT THEREOF

BACKGROUND OF THE INVENTION

The present invention relates to membrane filters and more particularly to membrane filters that have predetermined controlled porosity.

Membrane filters are typically microporous films made from a variety of materials such as, for example, polypropylene, polysulfone, PTFE (polytetrafluoroethylene), nylon, etc. They are used to retain particles or microorganisms larger than their stated pore size by surface capture and some particles smaller than their stated pore size by other mechanisms. Such filters usually have a rated pore size within the range of about 0.1 to 5 microns. The thickness of these filters is generally about 150 microns.

There are many different types of filters available for a variety of filtering purposes. The filters typically vary in separation capability, adaptability to the gas or liquid being filtered and the filtering environment. The choice of filter for a specific filtering application is mainly based upon pore size and membrane material. The pore size rating will determine the size of particles or microorganisms that can be separated. The membrane material will determine the type of liquid or gas which can be filtered and the relative controllability of pore size.

Typically, pore sizes are rated as nominal or absolute at particular sizes. All filters are rated at a particle size range over which they will retain in an absolute manner, and then all particles smaller than this will be retained in a nominal manner. For example, a filter may be absolute rated at 5 microns, but have only nominal retention of particles less than 5 microns in diameter.

Nominal retention depends upon adsorption of particles onto filter surfaces as the major mechanism of retention. This mechanism depends on particles significantly smaller than the filter's true pore finding size adsorption sites during their passage through the filter media. Particles are retained by electrostatic attraction or other surface-dependent phenomena. Retention can therefore be grossly affected by test and use parameters which can act either to dislodge particles, reduce contact time between particles and media, or saturate the adsorption sites.

Absolute retention ratings are based solely on mechanical capture, in which all particles equal to or greater than the rated pore size are physically retained within the filter because of its pore dimensions. Theoretically, all the pores in such filters are smaller than the rated pore size.

Although it is possible to predict with reasonable accuracy the maximum size of the largest significant number of pores in these membranes, a direct method of determining pore size is not available. There is a typical kind of bell curve that describes the distribution of pore size in a given product. Depending upon the product, pore size is relatively easy to control within certain ranges, but very difficult to control outside of these ranges. Since pore size is extremely important in separating desired particles from a liquid or gas stream, the ability to directly and accurately determine pore size would be a great advantage. The reason pore size cannot be directly determined is due to the common methods of manufacturing membrane filters. The most common methods are phase inversion process, skiving followed by biaxial stretching and nuclear bombardment. Each of these processes forms pores in the membrane, but these pores are irregularly shaped and distributed throughout the membrane with individual pores having several different dimensions between the top and bottom of the membrane filter.

The phase inversion process for fabricating membrane filters involves the use of three ingredients. A polymer is dissolved in a solvent, to which is added a relatively insoluble pore former. This mixture is cast onto a belt or glass plate, and the solvent is driven off. The pore former is trapped in the polymer as the polymer comes out of solution. Pore former trapped in spheres of polymer are called micells. As the number of micells increases (with decreasing solvent), they grow together to from an open-cell structure. Thereafter, the pore former is extracted, leaving the pure polymer as an open-cell structure. In the phase inversion process, time and temperature are important in determining pore size of the membrane filter. In this type of membrane filter, pore size is easy to control where the desired size is less than .5 microns, but very difficult to control in larger pore sizes, because the bell curve becomes very wide.

There are numerous limitations on the use of phase inversion-type membranes. As just described, one such limitation is the controllability of larger pore sizes. A second limitation is that the finished membrane filter may be readily attacked by a variety of solvents, which greatly restricts its field of use. Because the formation of these membranes relies upon the use and effect of solvents on the polymer, they cannot be used in certain commercially significant filtration processes utilizing solvents, such as, for example, production of antibiotics and solid-state chips.

The solvent problem found in phase inversion-type membrane filters is overcome by the use of membrane filters made from PTFE (polytetrafluoroethylene). This type of membrane filter has been developed by W.L. Gore Company and goes by the tradename of "Gore-Tex." PTFE is an inert material not vulnerable to attack by solvents. PTFE is a sintered compression-bonded amalgam. Membrane filters are made from this material by first skiving a billet of the material, that is, peeling off a very thin sheet from the billet, followed by biaxial stretching of the membrane to cause a type of structural failure in the membrane which results in the formation of pores. These pores are interconnected by very fine tendrils which affect pore size. When a stream of gas or liquid is passed through the membrane, the interconnecting tendrils capture the particles.

Although PTFE-type membrane filters avoid the problem of solvents, they nevertheless have limitations. First, practical unsupported membranes of such materials cannot be made with pore sizes greater than 1 micron, because the additional stretching necessary to open the pore size reduces the thickness of the membrane, and the product becomes too thin for handling. Additionally, as the membrane is further stretched, the tendrils begin to break, which greatly and randomly increases pore size beyond what is desired. A second disadvantage of these membranes is that they are attacked by radiation. Radiation breaks the weak bond chain that exists in PTFE materials. The type of bonding is not atomic or molecular, but rather sintered compression bonding. This is a serious disadvantage because medical and pharmaceutical applications of these filters rely upon radiation as the preferred method of sterilization.

A third method for formation of membrane-type filters is nuclear bombardment, which is used by the Nuclepore Company. A thin sheet of polymer is exposed to nuclear bombardment to weaken the structure by carbonizing small spots. These spots are then etched by a material which attacks only carbon. The resulting burn holes define the pore. Diameters are generally limited to less than 1 micron.

One disadvantage of membrane filters formed from nuclear bombardment is that it is not possible to get a large number of pores per unit area, and therefore these membranes have a low flow-through rate. Another disadvantage is that this process cannot be used on PTFE material because of the inherent susceptibility of PTFE to radiation. A further disadvantage of this type of membrane filter is the inability to accurately control the pore size, a common disadvantage of all of the above membrane filters. In nuclear bombardment-type membrane filter formation, double hits can occur at a specific site, creating a pore which is substantially larger than desired.

To summarize, all of the above membrane filters have various disadvantages dependent upon the application to which they are to be employed. Common disadvantages of current membrane filters are the inability to accurately predict pore size, poor chemical compatibility, inability to make large pore sizes and inability to obtain a membrane filter with controlled porosity.

SUMMARY OF THE INVENTION

Applicant's invention overcomes the above disadvantages in membrane filters by providing a method of manufacturing a membrane filter that has controlled porosity, including size, number and location of pores. This invention permits more accurate control of the bell curve of pore size, both as to width of the curve and the position of the curve. Another very important benefit of the present invention is its ability to be used on any membrane, including PFA, Perfluoroalkoxy, which is DuPont's third generation of Teflon TM. Heretofore, PFA has not been used as a membrane filter because it cannot be attacked by radiation or solvents; therefore, pore development has been unobtainable. However, with the ability to make pores in a PFA membrane, the disadvantages of solvent attack and radiation attack are obviated, making this a very desirable membrane filter in all applications.

The method of making a membrane filter in accordance with this invention includes the steps of first providing a non-porous membrane material, such as PFA or any materials commonly used as membrane filters. The membrane material is supported so that it is capable of being perforated by a piercing means, which in the preferred embodiment are probes which have tapered tips. Preferably, a plurality of probes are nested together in a circular arrangement or in rows so that a plurality of holes are created by a single stroke.

The support for the membrane can be of various types as long as the membrane is sufficiently supported to permit puncture by the needles. One example is a temporary support positioned beneath the membrane to control the position of the membrane during puncture. It is important that the support not dull the needle as the needle passes through the membrane. A further example is to support the membrane for puncturing by tensioning the membrane between at least two spaced points so that the membrane is generally taut for receipt of the piercing means. In one example of this method, the membrane can be pulled from a roll to a position adjacent the piercing means and simultaneously or thereafter tensioned for piercing. This is known as "piercing on the fly." A still further example is to tension the membrane in a stationary position to provide the necessary support.

The depth of stroke of the probe must be carefully controlled because the diameter of the hole depends upon the depth of penetration of the tapered tip. The tapered probe forms a tapered pore, referred to as an anisotropic or non-constant diameter pore. This is advantageous because the large diameter entry side of the pore functions as a pre-filter, whereas the small diameter exit side of the pore is the ultimate control on the size of particle which can pass through the membrane. In the preferred embodiment, the tapered tip is conical.

As can be appreciated, the distance between pores will be limited by the slope and length of the conical tip. Therefore, if greater flow rates are desired, i.e., a sufficient number of pores per unit area, it may be necessary to laterally shift or jog the membrane or the probes between successive strokes of the probes. Double hits are avoided because of the resiliency of the material. When the probe enters the material closely adjacent to a pore, the wall of that pore will move, either allowing a closely adjacent pore to be formed or allowing the probe to re-enter a previously formed pore.

Another advantage is the fact that these materials have a certain memory, which means that the diameter of the pore will decrease somewhat after withdrawal of the needle. This characteristic permits the membrane to be pressure-sensitive so that the pore size can increase if a slight pressure differential is applied across the filter. Thus, it is possible to make a membrane which is non-porous at very low pressure differentials, but becomes more porous as the latent or temporarily collapsed pores expand as a result of pressure differential across the membrane.

In certain applications, the memory of the material may be a disadvantage. In these applications, the probes may be heated when they pierce the material. This lowers the molecular weight at the heated opening, reducing the elastic memory of the membrane. A further method of avoiding the memory in the material is to chemically treat the membrane. One method is carbonizing, which leaves a carbon layer along the pore wall; a second method is to treat the membrane with sodium to remove the first layer of fluorines which decreases the product's memory.

Still another advantage of this product is the minimal relationship between pore size and membrane thickness. This increases the number of applications of the products. It is often a problem in the use of typical membranes made by prior art processes to increase the flow rate. That is, it is difficult for a given pore size to vary the number of pores. This product permits tailoring the flow rate so that it is not tied to pore size. More or fewer holes per given unit area can be used. It is even possible to make a pattern whereby the flow rate is varied in a non-uniform fashion across the area of the membrane.

Pore size control for this process involves the uniformity of probe formation and diameter, probe mounting (i.e., all probes being mounted so that they are at a given elevation relative to the plane of the membrane), probe stroke, jogging and avoidance of probe dulling.

BRIEF DESCRIPTION OF THE DRAWINGS

FIG. 1 is a perspective view of a method for making the membrane filter of the present invention including the nesting of a plurality of probes within a rack assembly.

FIG. 2 is a perspective view of a further method of making the membrane filter of the present invention employing the nesting of probes in a circular arrangement.

FIG. 3 is a perspective view still further method of forming the membrane filter of the present invention on the fly.

FIG. 4 is a plan view of the membrane filter of the present invention.

FIG. 5 is a cross-section of the membrane filter of the present invention illustrating the conical probes and pores.

DETAILED DESCRIPTION OF THE INVENTION

With reference to FIG. 4, the membrane filter of the present invention is shown generally at 10 and includes a membrane material 12 having a plurality of pores 14. Membrane material 12 can be made of a variety of materials commonly used for membrane filters including, for example, cellulose nitrate, regenerated cellulose, PTFE (polytetrafluoroethylene), cellulose acetate, etc. Additionally, the membrane material can be PFA, perfluoroalkoxy, which is DuPont's third generation of Teflon ™. Heretofore, PFA has not been used as a membrane filter because it cannot be attacked by radiation or solvents, the common methods for forming the pores in membrane filters. However, with the present invention, pores can be formed in a PFA membrane. This provides a superior membrane filter because the disadvantages of solvent attack and radiation attack during filter use are eliminated.

With reference to FIG. 5, pores 14 have a tapered shape with a large opening 16 at the top surface of membrane filter 10 and a smaller opening 18 at the bottom surface. This tapered configuration provides the advantage of pre-filtering, wherein the large diameter hole filters out larger particles while the small diameter exit side hole is the ultimate control of the size of particles which can pass through the membrane.

Pores 14 of the present invention are formed by mechanically puncturing the membrane material 12 with probes 20. Preferably, each probe 20 has a needle-like shape with an elongated body portion 22 ending in a tapered tip 24. In the preferred embodiment, the tip 24 is conical. Depending upon the mounting method used, the probes 20 can also have a head portion at the end opposite tips 24 (these heads are not shown). The head portion would be used if the probes were mounted in a holder having a plurality of apertures for receipt of the probes.

Preferably, the method of making the membrane filter of the present invention employs a plurality of probes 20 which are nested together. Further, in the preferred embodiment, the body portions 22 are cylindrical to facilitate nesting. However, the body portions 22 could have any cross-sectional shape, such as triangular, square, etc., as long as the needles can nest. Further, as indicated above, the tips 24 are preferably conical but can be any shape as long as they are tapered. As should be apparent, body portions 22 will abut each other with the distance between the terminus of any pair of tips 24 being equal to the sum of the radius of their respective body portions 22 or if all probes have the same diameter equal to the diameter of the probe.

The diameters of the entrance opening 16 and exit opening 18 of each pore 14 can be calculated by knowing angle "a" of the conical tip 24, the thickness "t" of the membrane and the distance "d" that probe 20 travels after initial contact with membrane 12. (In FIG. 5, the preferred maximum distance "d" is shown.) The diameters are determined by the following formulas:

entrance diameter = 2[(tan a)(d)]
exit diameter = 2[(tan a)(d-t)]

Since all of the above dimensions can be readily determined, a probe bundle can be pre-assembled to give a specific flow rate and absolute pore size rating.

Any absolute pore size rating can be achieved by the method of this invention and can be accurately predetermined by controlling the conical tip size of the probe and the depth of penetration. For example, in a material without significant elasticity, an absolute pore size rating of 2.5 micrometers is achieved with a probe having an angle "a" of 3 degrees, penetration of 0.005" and membrane thickness of 0.004". The pore diameter at the surface of the membrane is 0.00052" and at the exit is 0.00010". The effective pore size which determines flow rate, is 0.00010" diameter. Preferably, the absolute pore size rating of a filter membrane made by the method of this invention is between about 0.5 to 100 micrometers. For convenience, one micrometer equals approximately 0.00004 inches.

This example, as stated above, assumes no significant elasticity, and therefore is only theoretical. The calculation can therefore be used as a starting point for determining the actual dimensions involved, with some experimentation being required to determine the final dimensions, which will be governed by the physical properties and thickness of the desired material.

In the above example, the membrane was pierced by a plurality of probes nested together and pierced into the membrane in a vertical direction through one stroke. In addition to a predetermined pore rating, this method will give a certain flow rate through the membrane filter. If a greater flow rate is desired, the nested probes 20 need merely be laterally moved or jogged in a direction parallel to the membrane surface and then vertically shifted to pierce into the membrane surface a second time. In this way, a second grouping of pores interspaced among the first grouping of pores is formed, increasing the number of pores per unit of membrane area.

Because the needles are mechanically piercing the membrane surface and because the membrane is resilient, the problem of double hits is avoided. Double hits are typically found when pores are formed by nuclear bombardment. It is difficult to control the bombardment path with the result that pores may be formed which overlap one another. These are called double hits. If double hits occur, the integrity of the filter is lost. Double hits are avoided in this method because the walls of the pores can move when the probes re-enter the membrane after being jogged. This allows a closely adjacent pore to be formed because the dividing wall between the pores will stretch into the pore as the probe penetrates. Alternatively, the dividing wall of the pore will stretch away from the pore, allowing the probe to re-enter the pore.

With reference to FIG. 1, one method for nesting probes 20 is illustrated. This method includes a rack 30 which has a movable side wall 32 which can be moved against the body portions 22 of probes 20. Side wall 32 is controlled by an adjusting bolt 34 which is received within a nut bore 36 or threaded bore in the fixed wall 38 of rack 30. By threading adjusting bolt 34 into nut 36, side wall 32 is moved against probes 20 forcing them together and holding them in place by compression. A lock nut (not shown) could be used to prevent any loosening of the wall 32 with respect to probes 20. Side wall 32 has a track 37 for receipt of side wall 32 to facilitate smooth movement. Because of the importance of accurately controlled pore size, probes 20 must be vertically aligned and longitudinally positioned so that their lower tips 24 all end in a plane parallel to membrane 12. This can be accomplished by loosely arranging the probes 20 in the rack 30 and then gently setting the nested probes 20 onto a flat surface parallel to rack 30. The adjusting bolt 34 can then be tightened to compress the probes 20. In this way, the probes will all contact the membrane 12 simultaneously and will pierce the membrane at the same depth, as determined by the vertical movement of rack 30. A support member 26 supports membrane 12 so that probes 20 can pierce the membrane. Preferably, support 26 is made of a material which will not dull probes 20, such as for example PTFE. Rack 30 is controlled by a device 42 which ensures that rack 30 will move in a vertical plane so that conical tips 24 engage membrane 12 simultaneously. An example of device 42 is a press wherein the rack 30 forms the ram and support 26 forms the base.

With reference to FIG. 2, a second method of nesting probes 20 is illustrated. In this method, probes 20 are nested together in a circular configuration and then clamped together by a clamp 50. Again, a device 42 is used to vertically move the nested probes 20 into membrane 12. This second method is preferred because the probes are more easily nested because they naturally nest due to their cylindrical body portions.

With reference to FIG. 3, a third method of piercing the membrane material 12 is illustrated. In this method, the membrane material 12 is rolled from a drum 52 onto a drum 54 at a preselected rate of speed. As the membrane material is being drawn from drum 52, a piercing head 56 rotates at a preselected speed to pierce the membrane as it passes underneath the drum. Membrane 12 must be kept in tension so that it is taut for receipt of probes 20. Probes 20 are fixed to drum 56. The location and size of the pores will be dependent upon the synchronization of rotation of piercing head 56 with drums 54 and 52, the elevation of drum 56, and the length and spacing of the probes. Alternatively, piercing head 56 could move in a vertical direction and could employ one of the piercing methods illustrated in FIGS. 2 or 3.

There are many advantages of the membrane filter of the present invention. Of particular importance is the ability to obtain controlled porosity, including size, number and location of pores. Another important benefit of the present invention is its ability to be used on any membrane material, including PFA, perfluoroalkoxy, thereby permitting the fabrication of membrane filters for applications involving the use of solvents or radiation which would be destructive to certain membrane materials. Still further, the membrane filters can be functionalized, which is a common membrane filter treatment. Functionalizing involves treating the surface with a chemical that specifically binds other chemicals as they pass through the membrane filter.

Also advantageous is the fact that these materials have a certain memory, which means that the diameter will decrease somewhat after withdrawal of needle probes 20. This characteristic permits the membrane to be pressure-responsive so that the hole size can increase if a slight pressure differential is applied across a filter. Thus, it is possible to make a membrane which is non-porous at very low pressure differentials, but become more porous as the latent pores expand as a result of pressure differential across the membrane. If such a memory is undesirable, there are methods in which the elasticity at the pores can be reduced or eliminated. One such method is to heat the probes prior to piercing the material. This could be done for example by passing an electric current through the probes or pre-heating the probes with a heating source. A further method for avoiding the elastic memory is to chemically treat the membrane. One method of chemical treatment is by the common method of carbonizing. This leaves a carbon layer along the pore wall. A second method is to treat the membrane with sodium to remove the first layer of fluorines.

It should be understood that the disclosed method for making membrane filters is intended to be used on any material which can be perforated and used as a filter. This includes but is not limited to polypropylene, polysulfone, PTFE, nylon, PFA, etc. While the preferred embodiments of the present invention have been described so as to enable one skilled in the art to practice the techniques of the present invention, the preceding description is intended to be exemplary and should not be used to limit the scope of the invention. The scope of the invention should be determined only by reference to the following claims.

What is claimed is:

1. A method of making a membrane filter for use in separation of extremely small particles, said method comprising the steps of:
   (1) providing a non-porous membrane material;
   (2) supporting said membrane material such that said membrane is capable of being perforated;
   (3) perforating said membrane material at least one time with a plurality of tapered piercing means by relatively moving said piercing means with respect to said supported membrane material to form a plurality of pores therein, wherein said plurality of piercing means are bundled together to control the spacing between said pores;
   (4) controlling the depth of penetration of said tapered piercing means into said membrane material so that the resulting pore is tapered, the cross-sectional area of said pore at the piercing means entry side of said membrane material being greater than the cross-sectional area of said pore at the opposite side of said membrane material;
   whereby a membrane filter is formed having a predetermined controlled porosity.

2. The method of claim 1, further including the step of:
   (5) shifting the relative position of said piercing means and said membrane material generally parallel with respect to one another and thereafter repeating step (3);
   repeating step (5) a predetermined number of times to obtain a plurality of spaced pores in said membrane material with said pore size and number being predetermined.

3. The method of claim 1, wherein said step of supporting said membrane material includes tensioning said membrane between at least two spaced points such that said membrane is generally taut for receipt of said piercing means.

4. The method of claim 1, wherein said step of supporting said membrane material includes pulling said membrane material from a roll of membrane material to a position adjacent said piercing means and thereafter tensioning said membrane material between at least two points such that said membrane material is generally taut for receipt of said piercing means.

5. The method of claim 1, wherein said step of supporting said membrane material includes positioning a support means beneath said membrane material to control the position of said membrane during puncture without dulling said piercing means.

6. The method of claim 1, wherein said step of perforating said membrane material includes said tapered piercing means having a straight-sided untapered elongated body portion which extends from a tapered piercing end portion, and wherein said step of controlling the depth of penetration of said tapered piercing means assures that no part of said untapered elongated body portion penetrates to said opposite side of said membrane material.

7. A method of making a membrane filter for use in separation of extremely small particles, said method comprising the steps of:
(2) providing a non-porous membrane material;
(2) supporting said membrane material such that said membrane is capable of being perforated;
(3) perforating said membrane material at least one time with at least one piercing means by relatively moving said piercing means with respect to said supported membrane material to form at least one pore therein;
said step of perforating said membrane material includes a piercing means having a plurality of elongated probes, each probe having a straight-sided untapered body portion which extends from a tapered piercing end portion, said probes being bundled together such that each of said untapered body portions abut untapered body portions of parallel adjacent probes and said method including the further step of establishing the spacing of the pores formed by said piercing means by selection of the cross-sectional dimensions of said abutting untapered body portions;
whereby a membrane filter is formed having a predetermined controlled porosity.

8. The method of claim 7, further including the steps of longitudinally aligning said plurality of elongated probes such that the terminus of each of said tapered ends lies in a single plane.

9. The method of claim 1, further including the step of heating said piercing means such that the elastic memory of said membrane material is reduced so that said pore remains open.

10. The method of claim 1, further including the step of chemically treating said membrane material after said step of perforating to reduce the elastic memory of said membrane material.

11. The method of claim 1, wherein said membrane material is perfluoroalkoxy.

12. The method of claim 1, wherein said membrane material is a polymer.

13. The method of claim 1, wherein said membrane material is polytetrafluoroethylene.

14. The method of claim 1, wherein said pore size is approximately between about 0.5-100 micrometers.

15. The method of claim 1, wherein said plurality of tapered piercing means each including an elongated probe, each probe having a straight-sided untapered body portion which extends from a tapered piercing end portion, said probes being bundled together at said untapered body portions such that each of said untapered body portions abut untapered body portions of parallel adjacent probes, the spacing of said pores being controlled by selection of a cross-sectional dimension of said abutting untapered body portions.

16. A membrane filter for use in separating extremely small particles, said filter formed by the process of piercing tapered pores into a membrane with a plurality of piercing means comprising:
a membrane having a plurality of pores therein with each of said pores having a predetermined controlled shape and dimension between the entry and exit sides of said membrane and a substantially tapered cross-sectional configuration so that the cross-sectional area of said pores at said entry side is greater than the cross-sectional area of said pores at said exit side;
said pores being spaced from one another at predetermined locations;
whereby said membrane material has a predetermined controlled porosity and flow rate and whereby said tapered pores act as pre-screens at said entry side and final screens at said exit side; and
said tapered pores being formed by a plurality of tapered piercing means perforating a membrane material, said tapered piercing means being bundled together to control the spacing between said tapered pores and controlling the depth of penetration of said tapered piercing means such that the cross-sectional area of said pore at said exit and entry side may be controlled.

17. A membrane filter as recited in claim 16, wherein said plurality of tapered piercing means each including an elongated probe, each probe having a straight-sided untapered body portion which extends from a tapered piercing end portion, said probes being bundled together at said untapered body portions such that each of said untapered body portions abut untapered body portions of parallel adjacent probes, the spacing of said pores being controlled by selection of a cross-sectional dimension of said abutting untapered body portions.

* * * * *